United States Patent [19]

Udagawa

[11] Patent Number: 5,706,261
[45] Date of Patent: Jan. 6, 1998

[54] OPTICAL DISC DEVICE CAPABLE OF QUICK SEARCH FOR A BOUNDARY BETWEEN RECORDED AND UNRECORDED AREAS

[75] Inventor: Osamu Udagawa, Kanagawa, Japan

[73] Assignee: Sony Corporation, Tokyo, Japan

[21] Appl. No.: 460,320

[22] Filed: Jun. 2, 1995

[30] Foreign Application Priority Data

Jun. 2, 1994 [JP] Japan .................................. 6-121099

[51] Int. Cl.⁶ .................................................. G11B 7/085
[52] U.S. Cl. ........................ 369/32; 369/44.28; 369/58
[58] Field of Search ............................... 369/32, 47, 48, 369/54, 58, 44, 28

[56] References Cited

U.S. PATENT DOCUMENTS

| | | | |
|---|---|---|---|
| 5,148,418 | 9/1992 | Tsurushima | 369/32 |
| 5,175,719 | 12/1992 | Iimura | 369/58 |
| 5,206,850 | 4/1993 | Tezuka et al. | 369/48 |
| 5,216,660 | 6/1993 | Iimura | 369/16 |
| 5,295,124 | 3/1994 | Shirako | 369/32 |
| 5,559,778 | 9/1996 | Inokuchi et al. | 369/58 |

*Primary Examiner*—W. R. Young
*Attorney, Agent, or Firm*—Lise A. Rode, Esq.; Jerry A. Miller; Pasquale Musacchio, Esq.

[57] ABSTRACT

An optical disc recording device in which RF signals reproduced from a write-once optical disc are detected during track jump for detecting the boundary between a recorded area and an unrecorded area on the write-once optical disc. This defines a roughly defined boundary between the recorded and unrecorded areas which may be searched quickly. A more strictly defined boundary between the recorded and unrecorded areas, may be searched quickly by subsequently employing a binary search method to the roughly detected boundary.

6 Claims, 4 Drawing Sheets

OPTICAL DISC DEVICE CAPABLE OF QUICK SEARCH FOR A BOUNDARY BETWEEN RECORDED AND UNRECORDED AREAS

FIELD OF THE INVENTION

This invention relates to a write-once optical disc recording device for recording data on a write-once optical disc by radiating a light beam thereon.

BACKGROUND OF THE INVENTION

In a conventional optical disc device, the information can be recorded by radiating a light beam on a disc-shaped recording medium for sequentially forming pits thereon. Typical of such optical disc device is a CD-recordable (CD-R) conforming to the standard for a compact disc. The data structure of a CD-R, may be further appreciated with reference to the application entitled "Apparatus and Method for Completing and Incomplete Recording on an Optical Disc", U.S. Pat. No. 5,559,778, assigned to the assignee of the present invention and incorporated by reference herein.

The optical disc employed in the CD-R drive device is a write-once optical disc in which a light beam of high intensity is radiated thereon for altering optical properties of the recording layer between pre-grooves, which are pre-formed guide grooves, for writing the information only once.

On the write-once optical disc, there is provided a program area for recording data per se, such as speech data. Several methods of data recording may be used which fall under one of two categories; interrupted writing (or disc at once (DAO)) and uninterrupted writing. The latter category includes track at once (TAO) mode and packet recording mode (fixed or variable packet). The present invention relates to interrupted writing.

One method for data recording in the program area is a track-based write-once operation of subsequently writing data track-by-track. In the present specification, "track" which should be distinguished from "physical track", means a collection of data corresponding to a file or two or more files.

On the write-once optical disc, a lead-in area is formed inwardly of the program area, that is towards the disc center. The lead-in area is a region in which there is recorded management data for management of data recorded in the program area. Adjacent to the lead-in area towards the center of the disc is a program memory area (PMA). The PMA functions as a temporary memory for storing disc identification information as well as data indicating the portions of the disc that have been used for recording. Additionally, the PMA stores information concerning the start address and the end address of a track. The start and end address of the data recorded in the PMA area help define a unrecorded area in the PMA so that data may be written to this unrecorded area.

However, there are also occasions wherein data is written once on the basis of a packet recording, a packet being a unit of data smaller in size than a track. The packet-based data write-once operation is termed the "in-track write-once" operation. In this case, each track is made up of a variable number of packets and the information concerning the track start and end addresses are previously recorded in the PMA area. In the "in-track write-once" operation, data is sequentially recorded in succession, beginning from the first packet in the track. After interruption of the data recording operation, data recording is re-started at the unrecorded area next to the area in which the last data has been recorded.

An important difference between the two aforementioned methods is that information concerning identification of those portions of the PMA having data recorded thereon (i.e., the "use state") is recorded in the PMA only on the track basis. The information concerning the "use state" of the program area on the packet basis is not recorded in the PMA.

Consequently, for the "in-track once-write" operation, recorded data is directly read out for detecting the unrecorded area, that is for determining whether a subject area is a recorded area or an unrecorded area. To this end, a binary search method is generally employed. However, with the binary search method, the search time becomes longer as the number of physical tracks making up a "track" becomes larger. As used herein, the "physical tracks" which should be distinguished from "track", means an area scanned by an optical pickup during one complete revolution of the optical disc during data readout.

SUMMARY OF THE INVENTION

In view of the foregoing, it is an object of the present invention to provide a write-once optical disc recording device in which the unrecorded area in a file can be searched in a short time.

In accordance with the write-once optical disc device of the present invention, RF signals reproduced from the write-once optical disc are detected during track jump in order to detect a boundary between a recorded area and an unrecorded area on the once-write optical disc. In this manner, an approximate boundary between the recorded area and the unrecorded area may be searched quickly.

Once the approximate boundary has been determined, an accurate boundary between the recorded area and the unrecorded area may be detected more strictly using the binary search method. In this manner, a more strictly defined boundary between the recorded area and the unrecorded area may be searched quickly.

The boundary between the recorded area and the unrecorded area may be detected depending on the number of physical tracks of the area to be searched on the write-once optical disc using 1) both the method of detecting RF signals reproduced from the once-write optical disc during track jump and using the middle point search method or 2) only the binary search method. In this manner, the boundary between the recorded area and the unrecorded area may be searched quickly, while the time since insertion of the optical disc into the disc writing device until start of the data once-write operation may be shortened.

DESCRIPTION OF THE PREFERRED EMBODIMENT

Figure 1:
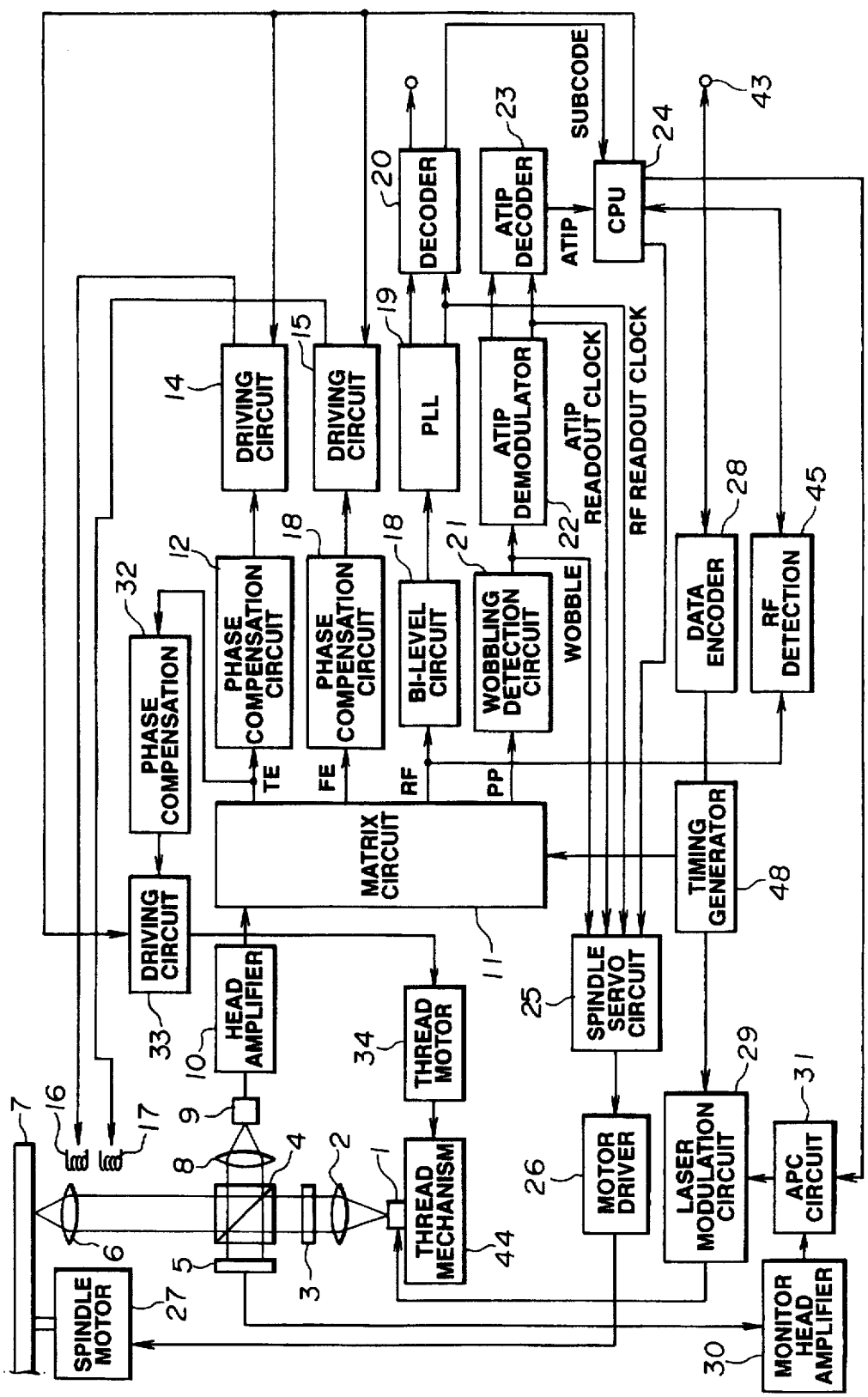
FIG. 1 is a schematic block diagram showing an arrangement of a write-once optical disc recording device according to the present invention.

Referring to the drawings, preferred embodiments of the present invention will be explained in detail. FIG. 1 shows, in schematic block diagram, a schematic arrangement of a write-once optical disc recording device according to the present invention.

During data recording data such as speech data transmitted from an external host computer enter a signal input terminal 43 via an interfacing circuit. The data is transmitted to an encoder 28 where it is encoded an convened into recording signals. These recording signals are equalized by a timing generating circuit 48 and thence transmitted to a laser modulating circuit 29. The data writing timing signals from the timing generating circuit 48 are transmitted to a matrix circuit 11. The laser modulating circuit 29 converts the equalized recording signals into a laser light output power which is transmitted to a laser diode 1.

The laser light (light beam) radiated from the laser diode 1 based on the laser output light power is collimated by a collimation lens 2 so as to be guided via a grating 3 and a beamsplitter 4 to an objective lens 6 whereby it is converged on a write-once optical disc 7. In this manner, the light beam illuminated on the optical disc 7 is controlled in intensity depending on "1" or "0" of the data for recording desired data on the disc.

Part of the light beam incident on the beam splitter 4 is separated by the beam splitter 4 so as to be incident on a laser monitor 5 where it is convened into a signal indicating its power. The signal is transmitted to a monitor head amplifier 30 and thereby amplified before being transmitted to an automatic power control (APC) circuit 31. Using the signal from the monitor head amplifier 30, the APC circuit 31 controls the power of the light beam outgoing from the laser diode 1 so as to be constant without regard to extraneous factors, such as temperature. The control signal from the APC circuit 31 is transmitted to a laser modulating circuit 29. Using the control signal from the APC circuit 31, the laser modulating circuit 29 controls the power of the light beam radiated from the laser diode 1 so as to be constant.

The reflected light of the light beam radiated on the optical disc 7 is incident on the beam splitter 4 via the objective lens 6. The beam splitter 4 guides the incident light from the disc to a multiple lens 8. The multiple lens is made up of a cylindrical lens and a converging lens and converges the incident light on a photodetector 9.

An output of the photodetector 9 is amplified by a head amplifier 10 so as to be outputted to a matrix circuit 11. The matrix circuit adds or subtracts outputs of the head amplifier 10 for generating a tracking error signal TE, a focusing error signal FE and a push-pull signal PP.

The tracking error signal TR and the focusing error signal FE are respectively transmitted to phase compensation circuits 12 and 13. The phase compensation circuit 12 phase-compensates the tracking error signal TE for servo control. The phase-compensated signals are transmitted to a driving circuit 14. The driving circuit 14 actuates a tracking actuator 16, using signal from the phase compensation circuit 12, for correctly shifting the objective lens 6 to a mechanical neutral position which is the pre-set tracking position in the radial direction of the optical disc 7. In the phase compensation circuit 13, the focusing error signals FE are phase-compensated for servo control. The resulting phase-compensated signals are transmitted to a driving circuit 15. The drive circuit 15 actuates a focusing actuator 17, using a signal from the phase compensation circuit 13, for vertically shitting the objective lens 6 relative to the optical disc 7 for converging the light beam more correctly on the recording surface of the optical disc 7.

The low-frequency component of the tracking error signal TE is fed to a thread phase compensation circuit 32 for phase compensation. The phase-compensated signals are transmitted to a driving circuit 33. The driving circuit 33 drives a thread motor 34 using the phase-compensated signals from the thread phase compensation circuit 32 for shifting the position of a thread mechanism 44 in a controlled manner. This causes controlled movement of an optical pickup, made up of the elements 1 to 10, along the radial direction of the optical disc 7.

The matrix circuit 11 outputs the push-pull signal PP which is fed to a wobbling detection circuit 21. The wobbling detecting circuit 21 detects wobbling which is outputted to an ATIP demodulator 22. The ATIP demodulator 22 detects ATIP and ATIP readout clock signals from the detected wobbling. The detected ATIP and ATIP readout clock signals are fed to an ATIP decoder 23. The ATIP decoder 23 reproduces the address information with the aid of the ATIP and ATIP readout clock signals. The reproduced address information is fed to a CPU 24.

The wobbling detected by the wobbling detection circuit 21 and the ATIP readout clock signals detected by the ATIP demodulator 22 are also outputted to a spindle servo circuit 25. The spindle servo circuit runs a spindle motor 27 in rotation via a motor driver 26 using the wobbling and the ATIP readout clock signals supplied thereto. At this time, the spindle servo circuit 25 controls the frequency of the wobbling detected by the wobbling detection circuit 21 to be constant at 22.05 kHz or controls the frequency of the ATIP readout clock signals outputted by the ATIP modulator 22 to be constant at 6.35 kHz.

Before proceeding to data write-once operation, the above-described write-once optical disc recording device searches for the boundary between the recorded area and the non-recorded area.

Figure 2:
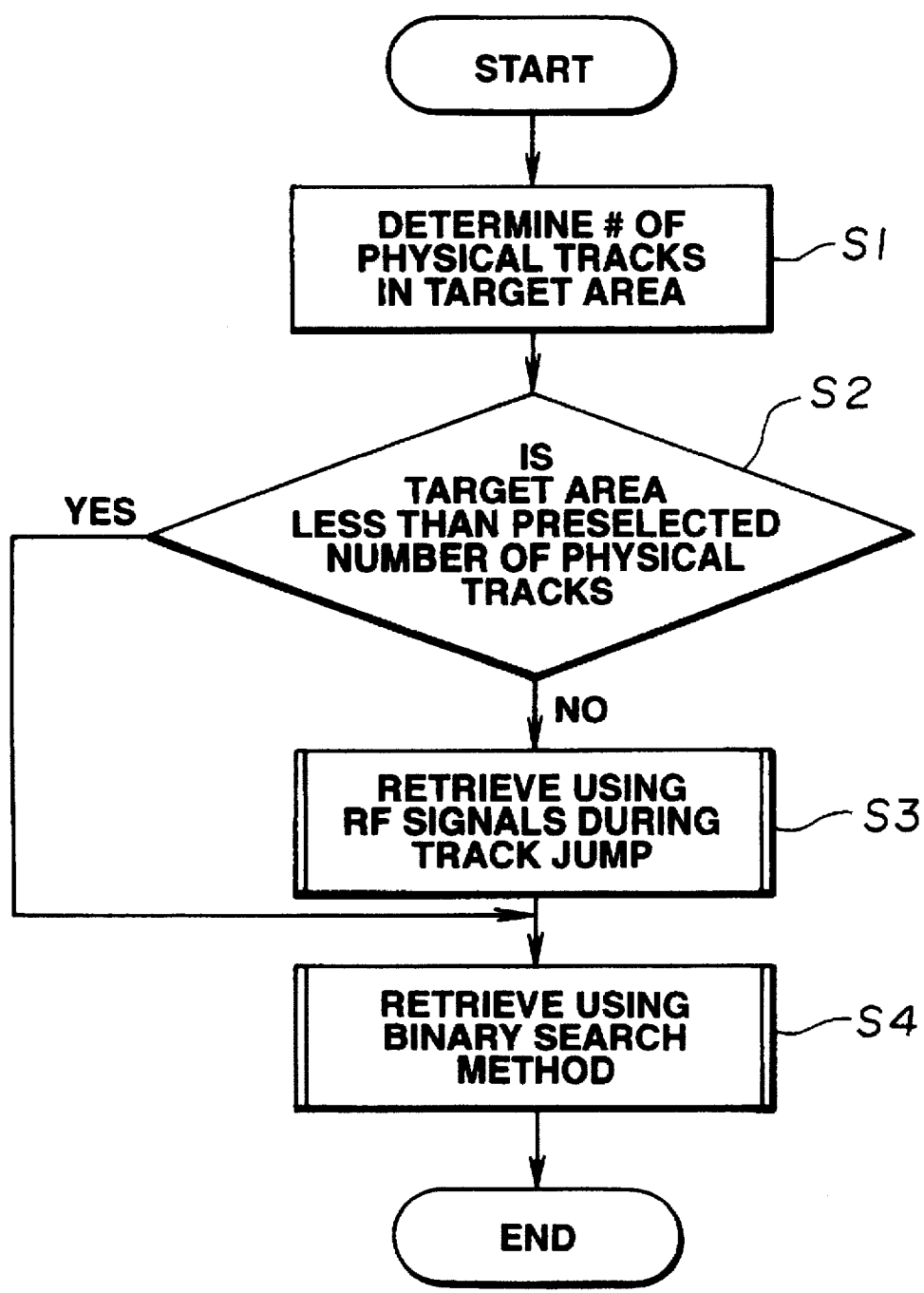
FIG. 2 is a flow chart for illustrating the sequence of retrieving the boundary between a recorded area and a unrecorded area.

FIG. 2 shows, in a flow chart, the sequence of operations of searching for the boundary between the recorded area and the unrecorded area according to one aspect of the present invention.

At step S1, the values of the leading address and the trailing address of a "track" to be searched are stored, as values of the leading address and the trailing address of an area to be searched, in a memory, not shown, enclosed in the CPU 24. At step S2, it is judged whether or not the size of the area under retrieval is not more than a preselected number of "physical tracks"; e.g., 3000. If the size of the area to be searched is not more than this preselected number, the position of a boundary between the recorded area and the unrecorded area is detected by using only the binary search method of step S4 (as explained further with reference to FIG. 4.), skipping step S3. If the size of the area to be searched is more than the preselected number of physical tracks, step S3 is carded out where a rough boundary search is carded out using the RF signals reproduced during track jump in order to detect the rough position of the boundary between the recorded area and the unrecorded area. An accurate boundary search is then performed using the binary search method of step S4 for accurately detecting the boundary between the recorded area and the unrecorded area.

Figure 3:
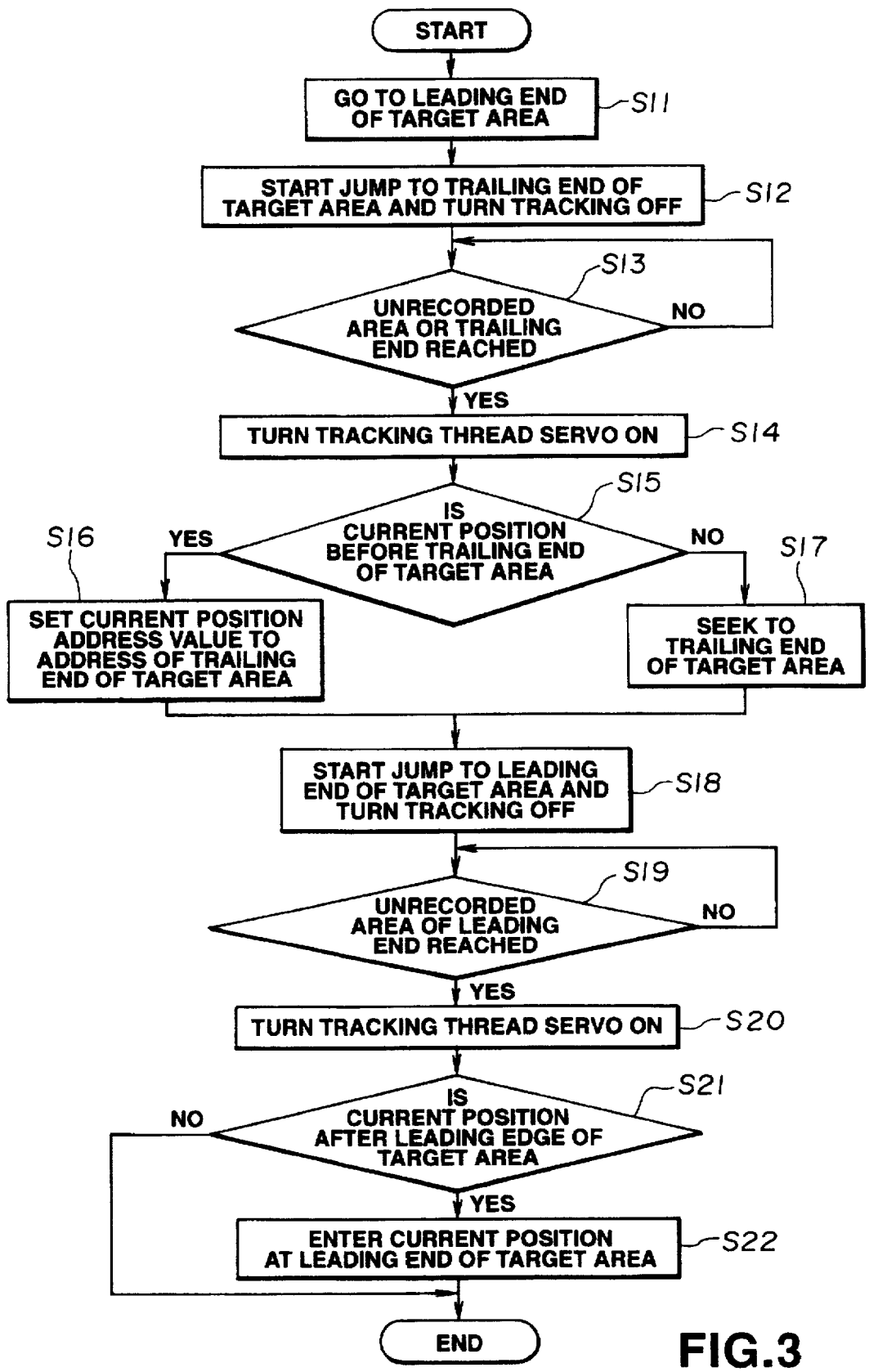
FIG. 3 is a flow chart for illustrating the sequence of retrieval using RF signals during track jump.

FIG. 3 shows, in a flow chart, the search sequence employing RF signals reproduced during track jump according to another aspect of the present invention.

At step S11, the optical pickup is set to the leading end of the area to be searched on the optical disc 7 by the seek operation. Control then shifts to step S12 in order to effect track jump towards the last address of the area to be searched.

In effecting such track jump, the laser light is radiated from the laser diode 1 (FIG. 1) onto the optical disc 7 at a playback power. The light radiated to and reflected back from the optical disc 7 is received by the photodetector 9, which then outputs a signal indicating the received light volume to the matrix circuit 11 via the head amplifier 10. The matrix circuit 11 generates the tracking error signal TE and the focusing error signal FE. These error signals are used for movement control of the tracking actuator 16 and the focusing actuator 17. The matrix circuit 11 also outputs RF signals, as reproduced signals, which are transmitted to an RF detection circuit 45. The RF detection circuit 45 judges whether or not data components are contained in the transmitted RF signals. The results of judgement are transmitted to the CPU 24.

The CPU 24 judges at step S13 whether or not the trailing end of the area to be searched or the unrecorded area in the area to be searched has been reached. If as yet the trailing end of the area to be searched or the unrecorded area within the area to be searched is not reached, track jump is again made and the judgement step of S13 is repeated. If it is judged at step S13 that the trailing end of the area to be searched or the unrecorded area in the area to be searched has been reached, the tracking servo and the thread servo are turned on at step S14 in order to make a halt at a position slightly advanced from the detected position.

Subsequently, it is judged at step S15 whether or not the current position of the optical pickup is more inward than the trailing end of the area to be searched. If the current position is found in this manner as being more inward than the trailing end of the area to be searched, the address value of the current position is set at step S16 to be the address value of the trailing end of the area to be searched. This narrows the area to be searched. If the current position is found as not being more inward than the trailing end of the area to be searched, the objective lens position surpasses the trailing end of the area to be searched. Consequently, the objective lens position is set to the trailing end of the area to be searched at step S17 by the seek operation.

Then, at step S18, track jump is made towards the leading end of the area to be searched, and it is then judged at step S19 whether or not the leading end of the area to be searched or the recorded area in the area to be searched has been reached. If it is found that the leading end of the area under retrieval or the unrecorded area in the area to be searched has not been reached, track jump is made towards the leading end of the area to be searched in order to repeat the judgement step of step S19. However, if it is found that the leading end of the area to be searched or the recorded area in the area to be searched has been reached, the tracking servo and the thread servo are turned on at step S20 in order to make a halt at a position further slightly advanced from the detected position.

At step S21, it is judged whether or not the current position of the optical pickup is more outward than the leading end of the area to be searched. If it is found in this manner that the current position of the optical pickup is more outward than the leading end of the area to be searched, control shifts to step S22 where the current address value is set as being the address value of the leading end of the area to be searched. The sequence of retrieval is now terminated. The above process narrows the area to be searched. If it is found at step S21 that the current position of the optical pickup is not more outward than the leading end of the area to be searched, the sequence of retrieval is terminated, with the address value of the leading end of the area to be searched remaining unchanged.

By performing the track jump and judging whether or not data has been recorded from the reproduced RF signals, the approximate boundary between the recorded area and the unrecorded area may be searched quickly.

Figure 4:
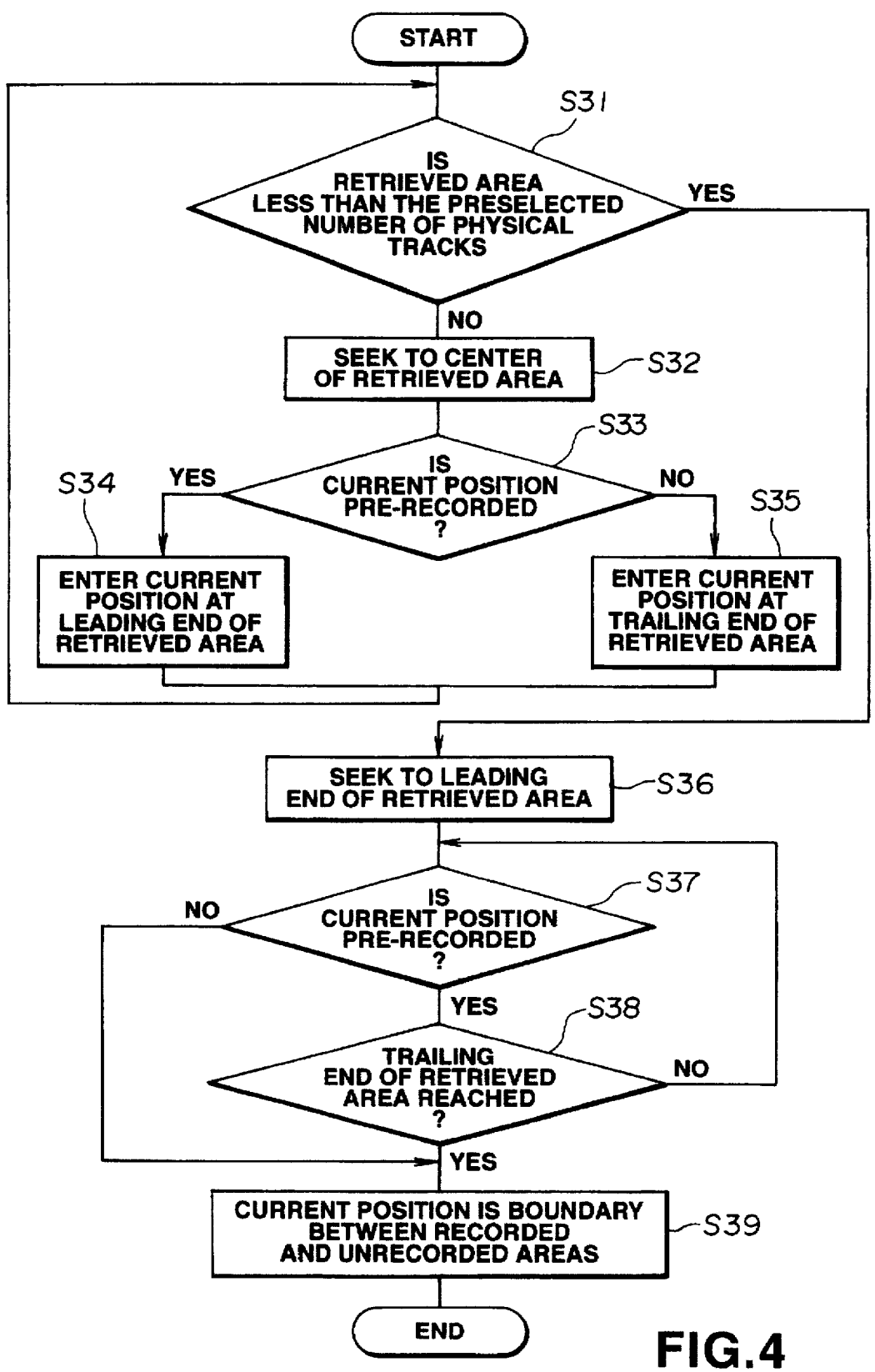
FIG. 4 is a flow chart showing the sequence of search operations using a binary search method according to the present invention.

FIG. 4 shows, in a flow chart, the sequence of search operations by the binary search method according to the present invention.

At step S31, it is judged whether or not the area to be searched, as set by employing the RF signals during the previous track jump, has been diminished to not more than a preselected number of "physical tracks", e.g., 4. If it is determined that the area to be searched is not less than this preselected number of physical tracks, control shifts to step S32 in order to start a seek operation towards the center of the area to be searched; that is towards the trailing end.

During the seek operation, the RF signals as detected by the matrix circuit 11 are routed to a bi-level circuit 18 where the signal are turned into corresponding bi-level signals. The resulting signals are routed to a PLL circuit 19, where clock signals are reproduced from the hi-level signals and are routed along with the bi-level signals to a decoder circuit 20. The decoding circuit 20 decodes the bi-level signals with the aid of the clock signals. This reproduces the data and the sub-code. The reproduced data is outputted at an output terminal 42, while the sub-code is transmitted to the CPU 24. The CPU 24 performs data control using the transmitted sub-code.

The clock signals reproduced by the PLL circuit 19 are fed to the spindle servo circuit 25 as readout clocks of the RF signals so as to be compared to reference clock signals. The resulting comparison output is routed to the motor driver 26 as a rotation error signal produced at the time of data reproduction. The motor driver 26 controls the rotational driving of the spindle motor 27 with the aid of the rotation error signal.

It is then judged at step S33 whether or not the current position of the optical pickup is recorded. If the current position is recorded, control shifts to step S34 where the address value of the current position is stored in the memory as being the address value of the leading end of the area to be searched. If the current position is not recorded, control shifts to step S35 where the address value of the current position is stored in the memory as being the address value of the trailing end of the area to be searched. If the operation of the steps S34 or S35 comes to a close, control reverts to step S31 where it is determined whether or not the size of the area to be searched is not more than the preselected number of physical tracks. The above sequence of operations is repeated until the size of the area to be searched is not more than the preselected number of physical tracks.

If it is found at step S31 that the size of the area to be searched is not more than the preselected number of physical tracks, control shifts to step S36 for performing a seek operation to the leading end of the area to be searched. Subsequently, at step S37, it is judged whether or not the current optical pickup position is recorded. If it is found in this manner that the current position is not recorded, the current position represents the boundary between the recorded area and the unrecorded area. Thus the address value of the current position is stored at step S39 in the memory to terminate the boundary search by the binary search method.

On the other hand, if it is found at step S37 that the current position has been recorded, control shifts to step S38 where it is determined whether or not the trailing end of the area to be searched has been reached. If it is found that the trailing end of the area to be searched has been reached, the address value of the current position is stored in the memory at step S39 to terminate the boundary search by the binary search method. If there is no unrecorded area in the area to be searched, the trailing end position of the area to be searched may be detected in the manner described above.

If it is found at step S38 that the trailing end position of the area to be searched has not yet been reached, the seek operation is further performed towards the leading end of the area to be searched in order to repeat the operation of judging whether or not the current position at step S37 is recorded.

It is noted that the size of the area to be searched, which is determined before starting the boundary search, and the size of the area to be searched, which is initially determined for the binary search method, may be set to optional values other than those given in the above embodiments.

What is claimed is:

1. An optical disc recording device in which a light beam is radiated on an optical disc for recording data thereon, said optical disc having recorded and unrecorded areas, said optical disc recording device comprising:

a tracking actuator;

a circuit for outputting error signals to control movement of said tracking actuator and for outputting RF signals during track jump of said tracking actuator;

rough boundary detecting means for receiving said RF signals and for roughly detecting a boundary between said recorded and unrecorded areas; and fine boundary detecting means for finely detecting said boundary by a binary search method.

2. The optical disc recording device according to claim 1, wherein said boundary between said recorded and unrecorded areas is roughly detected by said rough boundary detecting means and then finely detected by said fine boundary detecting means when the number of physical tracks in a search area of said optical disc is greater than a predetermined number and wherein said boundary is finely detected by said fine boundary detecting means without rough detection by said rough boundary detecting means when said number of said physical tracks in said search area of said optical disc is not greater than said predetermined number.

3. The optical disc recording device as claimed in claim 1, wherein said optical disc is a write-once optical disc.

4. An optical disc device for reading and recording data from and onto an optical disc including a number of physical tracks for storing said data thereon, said optical disc device comprising:

optical pickup means for reproducing signals by radiating a light beam onto said optical disc;

a tracking actuator for conveying said optical pickup means in a radial direction of said optical disc;

RF signal detection means for detecting whether RF signals are included in said signals reproduced by said optical pickup means;

a memory for storing addresses of a leading end and a trailing end of a search area of said optical disc, said search area having a recorded region and an unrecorded region therein; and control means for controlling said optical pickup means, said tracking actuator and said RF signal detection means to search a boundary between said recorded region and said unrecorded region within said search area, wherein said control means searches said boundary via a binary search method where the number of said physical tracks in said search area is less than a preselected number and wherein said control means searches said boundary via detecting said RF signals and then via said binary search method where the number of said physical tracks in said search area is not less than said preselected number.

5. An optical disc recording device in which a light beam is radiated on an optical disc for recording data thereon, said optical disc having recorded and unrecorded areas, said optical disc recording device comprising:

a tracking actuator;

a circuit for outputting error signals to control movement of said tracking actuator and for outputting RF signals during track jump of said tracking actuator;

rough boundary detecting means for receiving said RF signals and for roughly detecting a boundary between said recorded and unrecorded areas; and fine boundary detecting means for finely detecting said boundary by a dichotomizing search method.

6. The optical disc recording device according to claim 5, wherein said boundary between said recorded and unrecorded areas is roughly detected by said rough boundary detecting means and then finely detected by said fine boundary detecting means when the number of physical tracks in a search area of said optical disc is greater than a predetermined number and wherein said boundary is finely detected by said fine boundary detecting means without rough detection by said rough boundary detecting means when said number of said physical tracks in said search area of said optical disc is not greater than said predetermined number.

* * * * *